April 10, 1962   J. E. AHLBERG   3,028,982
BOAT TRAILERS
Filed Dec. 8, 1958   3 Sheets-Sheet 1
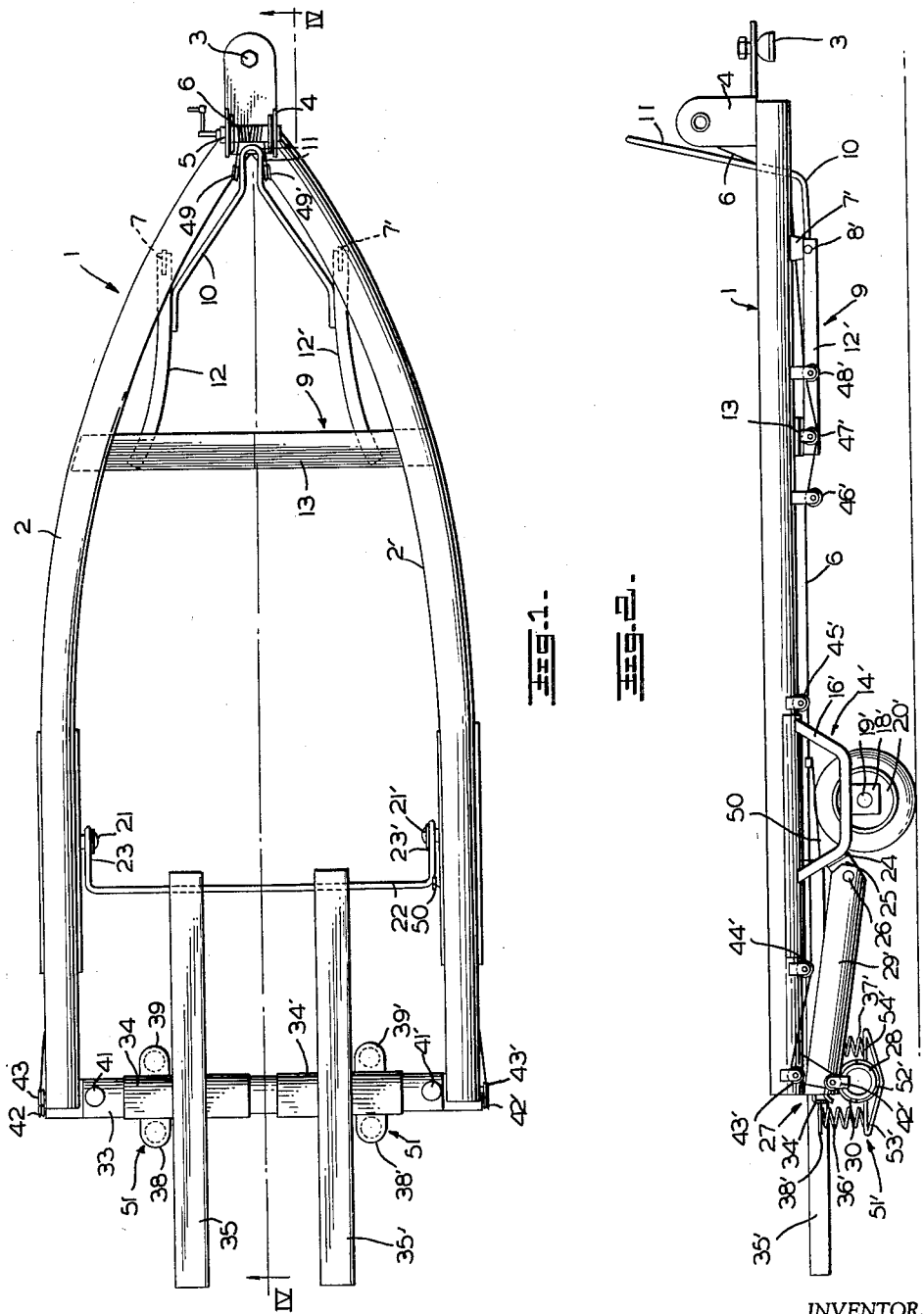
INVENTOR.
Jack E. Ahlberg,
BY
Smith, Michael & Gurdich
ATTORNEYS.

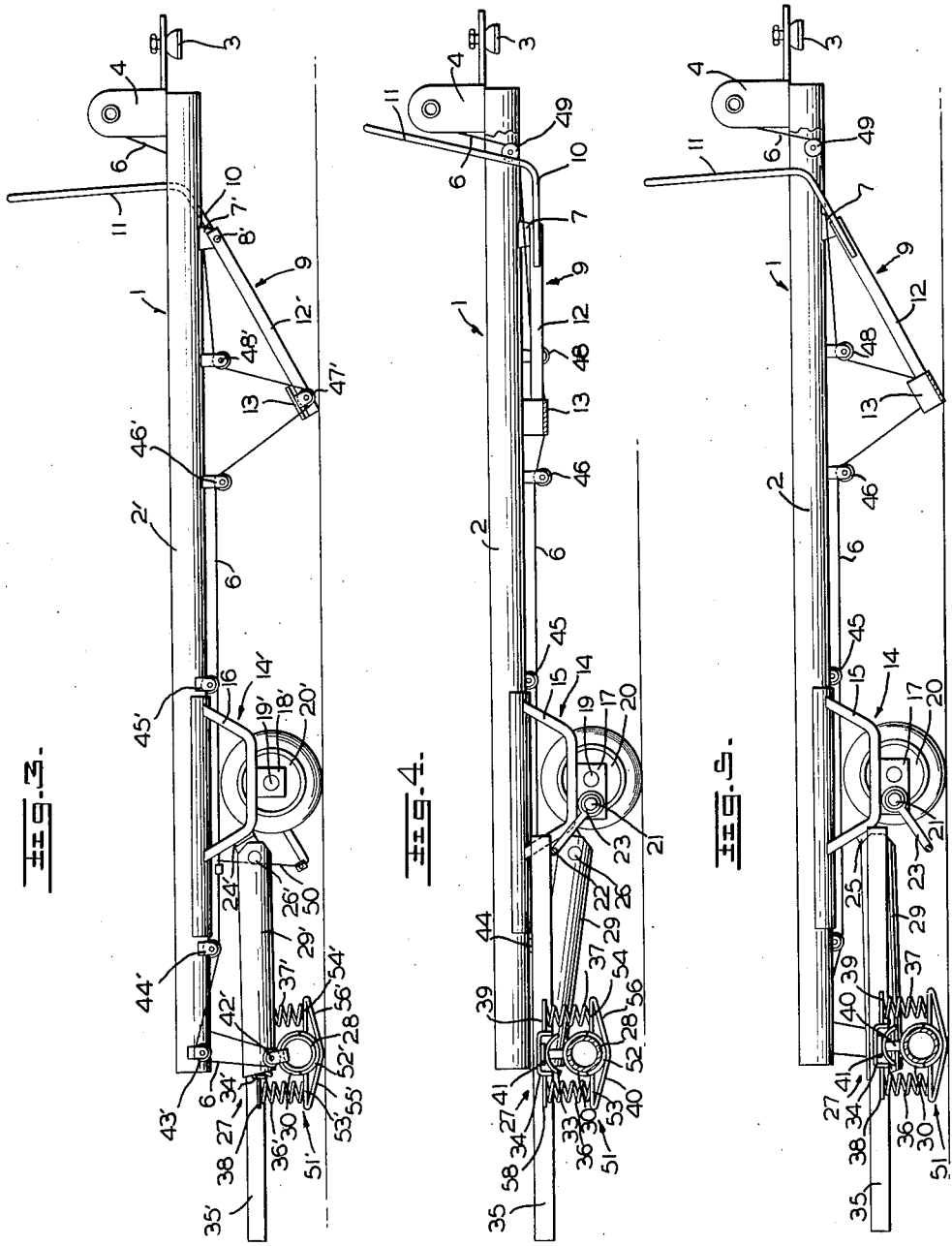

April 10, 1962 J. E. AHLBERG 3,028,982
BOAT TRAILERS

Filed Dec. 8, 1958 3 Sheets-Sheet 3

INVENTOR.
Jack E. Ahlberg,
BY
Smith, Michael & Gardiner
ATTORNEYS.

United States Patent Office 3,028,982
Patented Apr. 10, 1962

3,028,982
BOAT TRAILERS
Jack E. Ahlberg, 10 Harper Block, Harbor St.,
Conneaut, Ohio
Filed Dec. 8, 1958, Ser. No. 778,715
12 Claims. (Cl. 214—85.1)

This invention relates to a load carrying vehicle of a type having provision for facilitating the loading and unloading thereof. More particularly, this invention relates to a trailer of the boat carrying type wherein provision is made to lower the boat supporting members prior to the loading operation to enable a boat to be floated into position and thereafter to raise the boat supporting members into transporting position.

A principal object of this invention is to provide a vehicle of the type described having an improved load carrying means which permit loading in extremely shallow water.

Another object of this invention is to provide a vehicle of the type described having improved load carrying means which will adapt to loads of various bottom configurations.

Another object of this invention is to provide a vehicle of the type described which facilitates the loading of a boat in water under conditions of strong current or high winds.

Another object of this invention is to provide a vehicle of the type described which eliminates the need for precise alignment of boat and trailer during loading in water and thereby obviates the necessity of loading personnel placing themselves in the water.

Another object of this invention is to provide a resiliently supported load carrying assembly in which a plurality of resilient members share equally in the support of a load regardless of the angle of the plane of the bottom of the load.

Another object of this invention is to provide a vehicle of the type described having improved characteristics of stability.

A still further object of this invention is to provide a vehicle of the type described wherein the loading means are extremely simple in operation.

With these and further objects in view, this invention broadly comprises a load carrying vehicle having a chassis of substantially U-shaped configuration and including a pair of longitudinally extending members, load carrying means carried by said longitudinal members and provided for elevational movement with respect thereto, and a stabilizing bar connecting said longitudinal members and having an eccentric portion adapted for elevational movement to facilitate loading.

The above mentioned and still further objects of this invention will be apparent from the following specification and appended claims, reference being made to the accompanying drawings in which:

FIG. 1 is a top plan view of a boat carrying trailer embodying the subject of this invention.

FIG. 2 is a side elevation view of a boat carrying trailer embodying the subject matter of this invention, with the load carrying means shown in the elevated or transporting position.

FIG. 3 is a view as in FIG. 2 with the load carrying means shown in the lowered or loading position.

FIG. 4 is a sectional elevation taken on line IV—IV of FIG. 1 showing the load carrying means in the elevated or transporting position.

FIG. 5 is a view as in FIG. 4 showing the load carrying means in the lowered or loading position.

Figure 6:
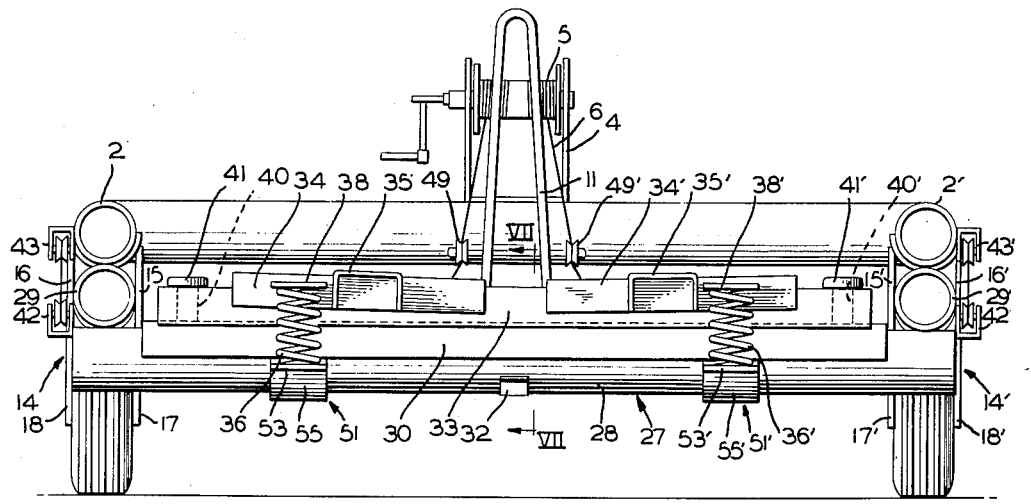
FIG. 6 is a rear elevation view of a boat carrying trailer embodying the subject of this invention.

The boat carrying trailer embodying the subject matter of this invention comprises a chassis generally indicated at 1 and having a substantially U-shaped configuration open in the rear, the legs of said U being formed by outwardly bowed longitudinally extending chassis members 2, 2'. The forward end of chassis 1 is provided with a conventional trailer hitch 3. Also mounted upon the forward end of chassis 1 is a support 4 for a winch 5 upon which is wound a cable 6 for stabilizing means to be described.

Fixed to the underside of chassis members 2, 2' near the forward portion thereof are depending lugs 7, 7' which, together with pintles 8, 8', provide a pivotal mounting for a forward load carrying assembly generally indicated at 9. The load carrying assembly 9 includes a substantially U-shaped member 10 having an upstanding inverted U-shaped portion 11 designed to provide a brace for the forward end of a load, such as the bow of a boat, which engages between the arms of the upstanding inverted U-shaped portion. The open ends of U-shaped member 10 are rigidly affixed to cradle supporting members 12, 12' which in turn are journalled at their forward ends to pintles 8, 8' to provide pivotal mounting between members 12, 12' and lugs 8, 8'. A transverse downwardly bowed load supporting cradle 13 is mounted upon the supporting members 12 and 12', connecting the rear ends thereof and extending transversely of the chassis 1.

Fixed to the underside of chassis members 2, 2' near the rear portions thereof are depending wheel mounting assemblies generally indicated at 14, 14'. Each of said wheel mounting assemblies comprise inner depending brackets 15, 15' and outer depending brackets 16, 16'. Depending from and rigidly affixed to inner brackets 15, 15' are plates 17, 17' and similarly affixed to outer brackets 16, 16' are plates 18, 18'. Axles 19, 19' are mounted between plates 17 and 18 and between plates 17' and 18' respectively, the end portions of said axles being supported by said plates. Wheels 20, 20' are journalled upon axles 19, 19' respectively.

Plates 17, 17' are provided with stud shafts 21, 21' respectively. A stabilizing bar is provided having an intermediate eccentric portion 22 and offset end portions 23, 23', the end portions 23, 23' being journalled upon stud shafts 21, 21' to provide for elevational swinging movement of said intermediate eccentric portion 22 about pivot points defined by stud shafts 21, 21'. This bar serves to stabilize the rear portions of the trailer by serving as a brace between the rear wheel assemblies which in turn are rigidly affixed to the longitudinal chassis members 2, 2'. The eccentric portion 22 may be lowered to a position near the surface of the bed of a body of water in which loading is taking place as illustrated in FIGS. 3 and 5 to permit free movement of a boat into loading position, and subsequently raised to an elevated transporting position clear of the road as illustrated in FIG. 4 without sacrificing stability of the trailer in either position. Thus, stability is maintained throughout both the period of shock and strain of road travel and during the period of stress placed upon the chassis by the hoisting of a heavy load into carrying position.

Base plate 24 is mounted upon the wheel assembly brackets 15', 16' the opposite end portions of base plate 24' being rigidly affixed to the rear portions of brackets 15' and 16' respectively and another base plate (not shown) is similarly mounted upon brackets 15 and 16. Rigidly affixed to said base plates and lying in a plane normal thereto are depending lugs 25, 25' which, together with pintles 26, 26' provide a pivotal mounting for a rear load carrying assembly generally indicated at 27. The rear load carrying assembly 27 includes a substantially U-shaped frame composed of an intermediate transverse tubular member 28 and longitudinally extending tubular leg members 29, 29' secured to the end portions of member 28 and the forward end portions of said members 29, 29' are journalled about pintles 26, 26' respectively to provide pivotal mounting between the load carrying assembly frame and the wheel mountings 14, 14'.

Carried by and surrounding the intermediate transverse tubular member 28 is a sleeve assembly comprising an elongated bearing member 30 of semi-circular cross sectional configuration, the inner diameter of which corresponds to the outer diameter of the tubular member 28', together with substantially triangular supporting members generally indicated at 51, 51' the upper sides of which intermediate arcuate portions 52, 52' of similar configuration. The end portions of the upper side of said triangular spring supporting members extend outwardly from either side of said arcuate portions 52, 52' to provide spring seats 53, 54 and 53', 54', and the other sides of the triangular spring supporting members form braces 55, 56 and 55', 56' to provide additional support for spring seats 53, 54 and 53', 54' respectively. The spring supporting members are welded to or otherwise rigidly affixed to the underside of bearing member 30 so that the intermediate arcuate portions 52, 52' co-operate with the bearing member 30 to provide a sleeve assembly surrounding the tubular member 28 and permitted to rotate about said member 28. In order to limit the degree of rotation of said sleeve assembly, tubular member 28 is provided with a stop lug 32 which coacts with the edges of bearing member 30.

The sleeve assembly provides a supporting base for resiliently carried load supporting means comprising an inverted elongated semi-circular member 33 and cradle members formed of intersecting inverted channel members 34, 34' and 35, 35', the inverted channels 34, 34' being rigidly affixed to the upper surface of inverted semi-circular member 33. Resilient support for the load carrying cradle assembly is provided by coil springs 36, 36', 37, 37' carried by spring seats 53, 53', 54, 54' of spring supporting members 51, 51' and coacting with lugs 38, 38', 39, 39' projecting from opposite sides of inverted channel members 34, 34' at a position overlying spring seats 53, 53', 54, 54' respectively. The cradle assembly is restrained from horizontal movement with respect to the sleeve assembly by upstanding studs 40, 40' which are rigidly affixed to the upper surface of inverted semi-circular member 30 and extend upwardly through apertures in inverted member 33, the apertures being of sufficient size to permit free vertical movement of the member 33 while restraining any horizontal movement with respect to the sleeve assembly. Upward movement of said semi-circular member 33 is limited, however, by enlarged heads 41, 41' on studs 40, 40'.

Figure 7:
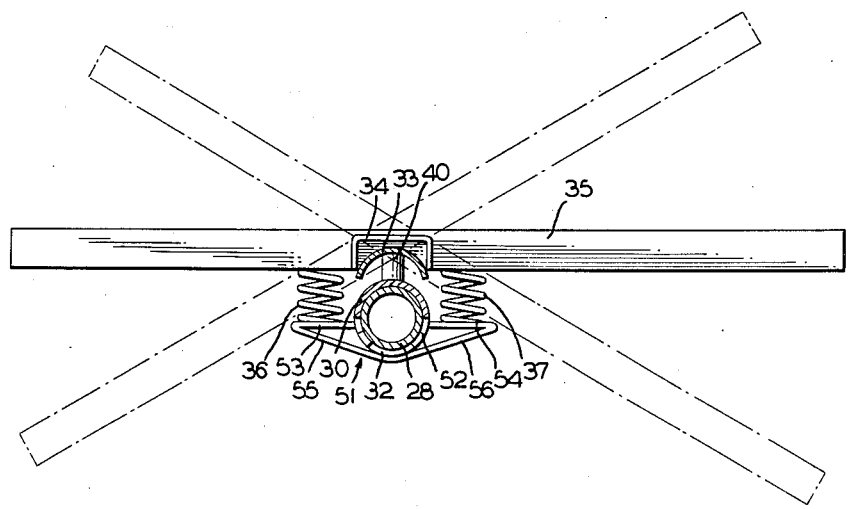
FIG. 7 is a cross section of the rear load carrying means taken on line VII—VII of FIG. 6.

As can readily be seen from the foregoing description and from reference to the drawings, the free rotational movement of the sleeve assembly about the intermediate tubular element 28 permits the load carrying cradle to readily conform to the plane of the bottom of a load by permitting cradle members 35, 35' to assume any position between the extremes illustrated by dotted lines in FIG. 7. By accomplishing conformation to the load bottom in the manner described wherein the entire spring assembly, including seats, moves together, excessive compression of one spring of each pair and consequent extension of the other is avoided, and each spring shares an equal proportion of the load regardless of the bottom configuration of the load. Similarly, the weight of the load is distributed equally among the plurality of resilient elements throughout the loading operation regardless of the degree of elevation of the load carrying assembly.

Operating cables 6 have their ends rigidly attached to the rear portion of longitudinal chassis member 2, 2' and extend downwardly and through pulley assemblies 42, 42' carried by the rear load carrying assembly 27, thence upwardly through pulley assemblies 43, 43', forwardly through pulley assemblies 44, 45, 46 and 44', 45', 46' mounted on longitudinal chassis members 2, 2', and again downwardly and through pulley assemblies 47, 47' mounted at the rear portion of forward load carrying assembly 9, thence upwardly and through chassis mounted pulley assemblies 48, 49 and 48' and 49' and terminating on the drum of the operating winch 5. Cable 6 is also provided with an extension 50 extending from a point upon cable 6 located above the eccentric portion 22 of the stabilizing bar to a point on said eccentric portion. If desired, an additional extension may be provided in a similar location upon the opposite side of the trailer to provide additional support for the eccentric portion of the stabilizing bar. Thus, it can be seen that operation of the cable through the medium of the winch 5 will serve simultaneously to elevate the rear load carrying assembly 27 through pulley assemblies 42, 42'; the eccentric stabilizing bar through extension 50; and the forward load carrying assembly 9 through pulley assemblies 47, 47'. It can also be seen by reference to FIG. 4 that the eccentric portion 22 of the stabilizing bar when in the elevated position is in contact with the underside of cradle members 35, 35'. In this manner the load supporting cradle and sleeve assembly is restricted from free rotational movement about intermediate tubular member 28 when the vehicle is traveling with no load. Thus, the eccentric stabilizing bar serves a dual function of providing stability between the wheel assemblies (and consequently the entire rear portion of the chassis) and of stabilizing the free floating rear load carrying cradle assembly while traveling empty.

In the loading operation, the trailer is backed into a shallow body of water and, by unwinding cable 6 from winch drum 5 both load carrying assemblies 9 and 27 and the eccentric portion 22 of the stabilizing bar are lowered to a loading position resting on or close to the bottom of the body of water as shown in FIGS. 3 and 5. A boat may then be floated into position between the longitudinal chassis members 2, 2' and over the load carrying assemblies 9 and 27 without encountering resistance by contact with any portion of the trailer. Inasmuch as the boat remains free floating while being brought into this position, it is not necessary to bring the boat into precise alignment with the trailer prior to and during the loading operation as is required by many previously known trailers. This eliminates a phase of the loading operation which is extremely troublesome when loading in strong currents or strong winds and often necessitates that loading personnel get into the water to hold the boat in aligment while being loaded.

After the boat is in the position indicated above, winch 5 is operated to wind in operating cable 6 and thereby elevate front and rear load carrying assemblies 9 and 27 to the transporting position shown in FIGS. 2 and 4. At the same time, cable 6 through extension 50 serves to move the eccentric portion 22 of the stabilizing bar to a position clear of the road and in contact with the underside of load carrying cradle members 35, 35' as illustrated in FIG. 4. The winch is locked in position and the trailer is ready for transportation.

From the foregoing it can be seen that there is provided by this invention, a boat trailer of extremely simple and economical construction which permits the loading of a boat by a single operator without the need of pulling the boat onto the trailer by moving it in contact with any structural members of the trailer, thereby avoiding the need for precise alignment of boat and trailer during loading and further avoiding straining of the boat and marring of the undersurface of the boat as often occurs with previously known trailers. The trailer permits loading under adverse conditions such as extremely shallow water, swift currents, wind, or rough water, with reduced chances of damage to the boat during the loading operation. The trailer exhibits good characteristics of stability provided by rigid construction throughout the chassis and wheel assemblies and an eccentric stabilizing bar near the rear portion of the open chassis. There is also provided a load carrying assembly having a cradle which will conform to loads of various bottom configurations so as to provide support over a wide expanse of the load bottom and thereby avoid damage to the bottom, at the same time orienting a plurality of resilient supporting members so that the total weight is distributed equally among them.

I claim:

1. In a boat trailer comprising a chassis of open ended substantially U-shaped configuration and including a pair of longitudinally extending chassis members; a load carrying assembly including a pair of leg members pivotally connected to said longitudinally extending chassis members and a transverse member connecting said leg members and extending across the open end of said U-shaped chassis, said pivotal connection providing for elevational movement of said load assembly from a loading position substantially below said chassis to an elevated carrying position near the level of said chassis, means for elevating said load assembly, a sleeve journalled on said transverse member, load supporting means carried by said sleeve, said sleeve providing for pivotal movement of said load supporting means on said transverse member to adapt said load supporting means to the fore and aft inclination of the bottom of a boat.

2. A boat trailer as set forth in claim 1 including resilient means carried by said sleeve and providing resilient support for said load supporting means.

3. A boat trailer comprising a chassis of substantially U-shaped configuration and including a pair of longitudinally extending chassis members; a load carrying assembly comprising a frame and a load carrying cradle carried by said frame, said frame being pivotally mounted on said chassis members and adapted for elevational movement with respect to said chassis; a transverse stabilizing bar independent of said load carrying assembly and having an intermediate portion and offset end portions, said end portions being permanently journalled to said chassis members, and said intermediate portion underlying a portion of said load carrying cradle and adapted for elevational movement with respect to said chassis to engage the underside of said load cradle.

4. A boat trailer comprising a chassis; at least one pair of rigid wheel supporting assemblies fixed to and depending from said chassis; an eccentric stabilizing bar having its end portions journalled to the wheel supporting assemblies of said pair and adapted for elevational movement of the eccentric portion; a load carrying assembly comprising a frame and a load carrying cradle resiliently carried by said frame, said frame being pivotally mounted on said chassis and adapted for elevational movement with respect to said chassis.

5. A boat trailer as set forth in claim 4 and including cable actuating means common to said load carrying assembly and to said stabilizing bar and adapted to elevate said load carrying assembly and the eccentric portion of said stabilizing bar simultaneously.

6. A boat trailer as set forth in claim 4 wherein the eccentric portion of said bar underlies a portion of said resiliently carried cradle and is adapted to engage the underside of said cradle when in the elevated position.

7. A boat trailer comprising a chassis of substantially U-shaped configuration and including a pair of longitudinally extending chassis members; an eccentric stabilizing bar swingingly mounted between said chassis members and adapted for elevational movement of the eccentric portion with respect to said chassis; independent front and rear load carrying assemblies pivotally mounted on said chassis and adapted for elevational movement with respect to said chassis; and cable operating means common to said load carrying assemblies and said bar and adapted to elevate both of said load carrying assemblies and the eccentric portion of said bar simultaneously.

8. A boat trailer as set forth in claim 7 wherein the eccentric portion of said bar underlies a portion of said rear load carrying assembly and is adapted to engage the underside of said rear load carrying assembly when in the elevated position.

9. A boat trailer comprising a chassis; at least one pair of rigid wheel supporting assemblies fixed to and depending from said chassis; an eccentric stabilizing bar swingingly mounted between the wheel supporting assemblies of said pair and adapted for elevational movement of the eccentric portion; independent front and rear load carrying assemblies, at least one of which comprises a frame and a load carrying cradle resiliently carried by said frame, said frame being pivotally mounted on said chassis and adapted for elevational movement with respect to said chassis; and cable operating means common to said load carrying assemblies and said bar and adapted to elevate both of said load carrying assemblies and the eccentric portion of said bar simultaneously.

10. A boat trailer as set forth in claim 9 wherein the eccentric portion of said bar underlies a portion of said resiliently carried load cradle and is adapted to engage the underside of said cradle when in the elevated position.

11. A boat carrying trailer comprising a chassis of substantially U-shaped configuration and including a pair of outwardly bowed longitudinally extending chassis members; a front load supporting cradle assembly including a cradle, a pair of cradle supporting members carried by and pivoted to said chassis for elevational movement with respect to said chassis and an intermediate member including an upstanding inverted U-shaped portion adapted to receive a portion of a load between the arms of said U-shaped portion; at least one pair of wheel supporting assemblies rigidly affixed to and depending from said longitudinally extending chassis members; an eccentric stabilizing bar swingingly mounted between the wheel supporting assemblies of said pair and adapted for elevational movement of the eccentric portion; a rear load carrying cradle assembly including a frame mounted on said longitudinally extending chassis members and provided for elevational movement of said frame with respect to said chassis, said frame including a transverse tubular element, a sleeve surrounding and journalled on said tubular element, load supporting means carried by said sleeve, said sleeve providing for rotational movement of said load supporting means around said tubular element to adapt to the longitudinal plane of the bottom of a load; and cable operating means common to said front and rear load carrying assemblies and to said stabilizing bar and adapted to elevate both of said load carrying assemblies and the eccentric portion of said bar simultaneously.

12. A boat carrying trailer as set forth in claim 11, wherein the eccentric portion of said bar underlies a portion of said load supporting means is adapted to engage the underside of said load supporting means when in the elevated position.

References Cited in the file of this patent

UNITED STATES PATENTS

| | | |
|---|---|---|
| 801,415 | Strange | Oct. 10, 1905 |
| 2,503,535 | Yarbrough | Apr. 11, 1950 |
| 2,536,563 | Montgomery | Jan. 2, 1951 |
| 2,693,288 | Black | Nov. 2, 1954 |
| 2,766,897 | Alker | Oct. 16, 1956 |
| 2,786,815 | Cook | Mar. 19, 1957 |
| 2,865,522 | Peterson et al. | Dec. 23, 1958 |
| 2,936,088 | Andersen | May 10, 1960 |